| (12) | United States Patent | (10) Patent No.: | US 8,307,645 B2 |
|---|---|---|---|
| | Mischler et al. | (45) Date of Patent: | Nov. 13, 2012 |

(54) APPARATUS AND METHOD FOR AVOIDANCE OF TURBOCHARGER SURGE ON LOCOMOTIVE DIESEL ENGINES

(75) Inventors: James Robert Mischler, Girard, PA (US); Kendall Roger Swenson, Erie, PA (US)

(73) Assignee: General Electric Company, Schenectady, NY (US)

( * ) Notice: Subject to any disclaimer, the term of this patent is extended or adjusted under 35 U.S.C. 154(b) by 1201 days.

(21) Appl. No.: 11/265,709

(22) Filed: Nov. 2, 2005

(65) Prior Publication Data

US 2007/0095063 A1 May 3, 2007

(51) Int. Cl.
| F02B 33/44 | (2006.01) |
| F02D 23/00 | (2006.01) |
| F04D 27/02 | (2006.01) |
| F04D 27/00 | (2006.01) |
| F04D 15/00 | (2006.01) |

(52) U.S. Cl. ............. 60/605.1; 60/600; 415/27; 415/17

(58) Field of Classification Search ............ 60/600–603, 60/605.1; 415/27, 16, 17, 20
See application file for complete search history.

(56) References Cited

U.S. PATENT DOCUMENTS

| 2,990,104 | A  | * | 6/1961  | Pavlecka ........................ 417/406 |
| 4,608,833 | A  | * | 9/1986  | Kountz ......................... 62/228.1 |
| 6,298,718 | B1 |   | 10/2001 | Wang |
| 6,311,493 | B1 | * | 11/2001 | Kurihara et al. ................ 60/600 |
| 6,779,344 | B2 | * | 8/2004  | Hartman et al. ................ 60/600 |
| 6,782,737 | B2 | * | 8/2004  | Wright ........................ 73/114.16 |
| 6,945,047 | B2 |   | 9/2005  | Shea et al. |
| 7,007,472 | B2 | * | 3/2006  | Baize et al. .................... 60/602 |
| 7,089,738 | B1 | * | 8/2006  | Boewe et al. ................. 60/605.2 |
| 2004/0118117 | A1 | * | 6/2004 | Hartman et al. ................ 60/602 |
| 2005/0132705 | A1 | * | 6/2005 | Boley et al. .................. 60/605.1 |
| 2006/0213193 | A1 | * | 9/2006 | Koopmans ...................... 60/602 |
| 2007/0039320 | A1 | * | 2/2007 | Gu et al. ........................ 60/599 |
| 2009/0013687 | A1 | * | 1/2009 | Swenson et al. ................ 60/600 |
| 2009/0024295 | A1 | * | 1/2009 | Swenson et al. .............. 701/100 |

* cited by examiner

*Primary Examiner* — Thai Ba Trieu
(74) *Attorney, Agent, or Firm* — GE Global Patent Operation; John A. Kramer

(57) ABSTRACT

A method for preventing a surge event prior to a first surge event occurring in an engine system including a turbocharger and a diesel engine operable at a plurality of discrete speeds, the method comprising sensing an operating parameter of the engine system that determines a surge margin, determining whether a change in the sensed operating parameter may result in exceeding the surge margin, and controlling an operating input to the engine system to prevent the surge event from occurring.

14 Claims, 3 Drawing Sheets

APPARATUS AND METHOD FOR AVOIDANCE OF TURBOCHARGER SURGE ON LOCOMOTIVE DIESEL ENGINES

FIELD OF THE INVENTION

This invention relates to diesel-electric traction vehicles such as locomotives equipped with turbocharged diesel engine systems and, more particularly, to control the engine's operation in order to avoid turbo charger surge events prior to any turbo charger surge events occurring.

BACKGROUND OF THE INVENTION

In a conventional diesel electric locomotive, a thermal prime mover diesel engine is used to drive an electrical transmission. To increase a maximum amount of useful power that a locomotive engine of given size can develop when at a discrete speed, the usual practice is to equip the engine with a combustion air supercharger or turbocharger. In a typical turbocharger, a turbine is driven by engine exhaust gas. The turbine then drives a compressor that draws in ambient air and increases the pressure of intake air provided to the engine. This permits more fuel to be burned in the cylinder, and therefore the expanding products of combustion will exert more force on the piston during each power stroke. The main advantage of a turbocharger is that it increases the power output of a diesel engine. However, the addition of the turbocharger to the engine also increases that complexity of the operation of the engine and its control and maintenance.

One of the common control problems of a turbocharged diesel engine is turbocharger surge. Surge is a phenomena exhibited by centrifugal compressors of the type used in turbochargers in which the compressor becomes unstable at low compressor air flows and high boost pressures. Turbocharger surge is undesirable in engine operation and prolonged surging can lead to fatigue failure of engine components due to the large pulsations of pressure that repeatedly occur during surge.

Though techniques and apparatus are available to detect and control an engine's operation to avoid surge events, most base their detection on recording actual surge events and then provide for preventing future events.

BRIEF DESCRIPTION OF THE INVENTION

The present invention provides for a method, system, and computer software program to control the engine's operation in order to avoid turbo charger surge events prior to any turbo charger surge events occurring. Towards this end, a method for preventing a surge event prior to a first surge event occurring in an engine system including a turbocharger and a diesel engine operable at a plurality of discrete speeds is disclosed. The method comprises sensing an operating parameter of the engine system that determines a surge margin. A determination is made as to whether a change in the sensed operating parameter may result in exceeding the surge margin. Operating input to the engine system is controlled to prevent the surge event from occurring.

A system for preventing a surge event prior to a first surge event occurring in an engine system including a turbocharger and a diesel engine operable at a plurality of discrete speeds is also disclosed. The system comprises a sensor for measuring an operating parameter of the engine system that determines a surge margin. A processor is also provided that is responsive to the sensor for determining whether a change in the sensed operating parameter may result in exceeding the surge margin. An engine control system is included and is responsive to the processor for controlling operating input supplied to the engine system to prevent the surge event from occurring.

A computer software program for preventing a surge event prior to a first surge event occurring in an engine system including a turbocharger and a diesel engine operable at a plurality of discrete speeds is also disclosed. The program comprises a computer module for calculating a surge margin. A computer module for comparing the calculated surge margin to a reference surge margin is also a part of the program. A computer module for regulating input parameters to the engine system responsive to an error determined when comparing the calculated surge margin to the reference surge margin is another part of the program.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
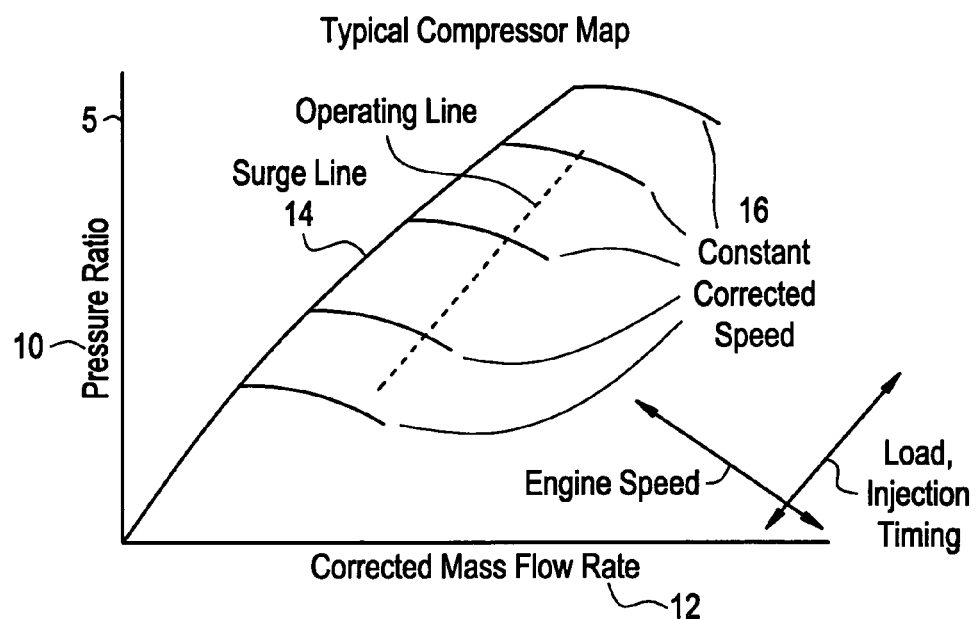
FIG. 1 is a graphical representation of a typical prior art turbocharger compressor map that depicts the engine operating line and the turbocharger surge line as functions of a pressure ratio and a corrected mass flow.

With reference to the figures, exemplary embodiments of the invention will now be described. However, it should be noted that though the present invention is describe for implantation with locomotive diesel engine systems, it is also applicable to other traction motors, marine engines and generator set engines.

Broadly speaking, the invention provides a method, apparatus, and program preventing a surge event prior to a first surge event occurring. To facilitate an understanding of the present invention, it is described hereinafter with reference to specific implementations thereof. The invention is described in the general context of computer-executable instructions, such as program modules, being executed by a computer. Generally, program modules include routines, programs, objects, components, data structures, etc. that perform particular tasks or implement particular abstract data types. For example, the software programs that underlie the invention can be coded in different languages, for use with different platforms. It will be appreciated, however, that the principles that underlie the invention can be implemented with other types of computer software technologies as well.

Those skilled in the art will recognize that the present invention allows for turbocharger operation to occur up to but not to a point to cause a surge event. One of the primary benefits of the present invention is a reduction in fuel consumption. Towards this end, engine system parameters, discussed below, only need to be adjusted by a minimum amount to avoid turbocharger surge. Thus, engine speed or waste-gate amount may be minimized resulting in decreased fuel consumption compared with a system that reacts to an actual surge event. Further, engine system reliability is improved since stress resulting from a surge event is eliminated.

Referring now to the drawings, embodiments of the present invention will be described. The invention can be implemented in numerous ways, including as a system (including a computer processing system), a method (including a computerized method), an apparatus, a computer readable medium, and a computer program product. Several embodiments of the invention are discussed below.

FIG. 1 is a graphical representation of a typical prior art turbocharger compressor map that depicts the engine operating line and a turbocharger surge line as functions of a pressure ratio and a corrected mass flow. The performance of the turbocharger's compressor is usually represented by a graph 5 of pressure ratio 10 versus mass flow 12. The overall shape of the graph, or map 5, as defined by the constant engine speed lines and compressor speed lines 16, is based on measured performance of a turbocharger 18 mated to a particular engine 20.

In a typical compressor map 5, the left boundary of the compressor map 5 defines a surge line 14 that defines the limit of stable operation for the turbocharger or compressor 18. If the operation of the turbocharger 18 results in a pressure ratio at a mass flow that is an operating point to the left of the surge line 14, airflow to the compressor 18 is reduced thereby producing intermittent pulsations and interruption of steady airflow through the compressor. This condition is referred to as surge.

The turbocharger 18 is normally designed for a particular engine 20 to operate at a distance from the compressor surge line 14 in order to obtain maximum operating efficiency of the engine 20. In an initial system design, turbocharger surge is avoided by designing the compressor 18 and engine 20 combination such that the operating range of the diesel engine does not encroach on the surge line. A "surge margin" is a measure of how far the operating point lies from the surge line 14. Variables such as ambient conditions, degradation of system performance, or malfunctions within the engine system can reduce this "surge margin" and bring about unexpected and undesired turbocharger surging.

The diesel electric locomotive, and less so marine and generator set engines, encounter a large variety of ambient conditions and factors that degrade performance over the engine service life. Hence, the initial design factors may no longer prevent the engine from encroaching on or even over the surge line. Compressor surge can be overcome by modifying the operation of the engine 20 such that the pressure ratio across the compressor is reduced, or the mass flow through the compressor is increased, thereby shifting the operating position down and/or to the right of the surge line.

Techniques for increasing the surge margin may include changing the turbo diffuser characteristics, utilizing a compressor discharge bypass valves, turbine exhaust waste gates, increasing the flow through the cylinders with injection or valve timing, resolving excessively high combustion air temperatures, preheating inlet air in the case of cold ambient temperatures, or reducing turbocharger speed (and thereby compressor pressure ratio) with a turbine nozzle area change. Additionally, a surge condition can be overcome by decreasing the engine load by reducing the alternator excitation, or by increasing the engine speed to thereby increase the mass airflow through the turbocharger. For a particular turbocharger and engine arrangement, an increase in the engine speed shifts the operating line away from the surge line (down and to the right) by increasing mass airflow and slightly reducing pressure ratio across the compressor. However, overcoming surge events are not usually accomplished until after at least one surge event has been detected.

Figure 2:
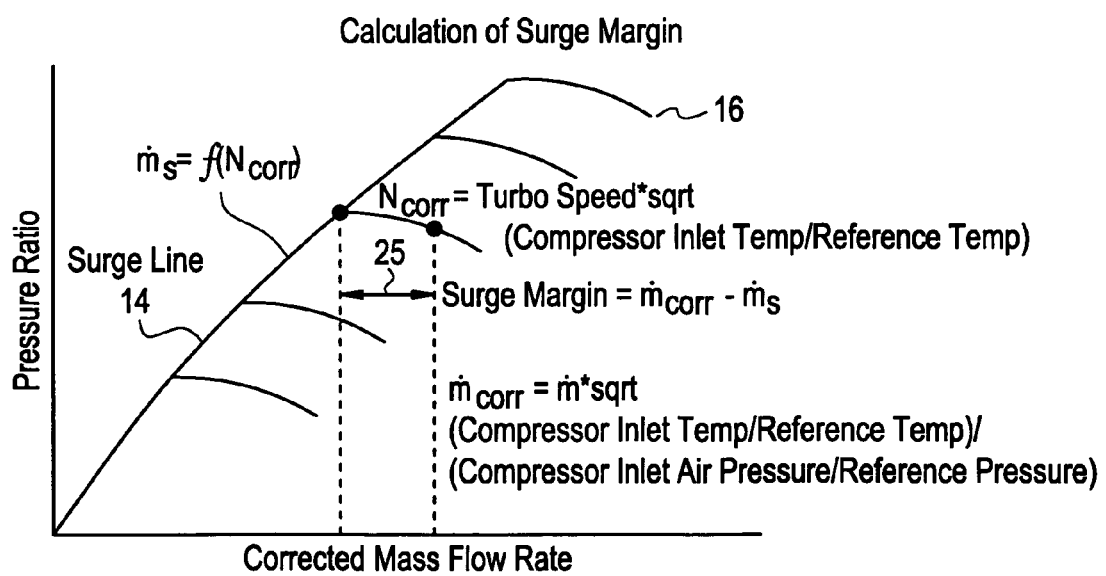
FIG. 2 is a graphical representation of a calculated surge margin that depicts the turbocharger surge line and a surge margin at a particular constant corrected speed as functions of a pressure ratio and a corrected mass flow.

FIG. 2 is a graphical representation of a calculated surge margin that depicts the turbocharger surge line and a surge margin at a particular constant corrected speed as functions of a pressure ratio and a corrected mass flow. A surge margin 25 is calculated wherein it is defined as the difference between the operating corrected mass flow rate of the engine and the corrected mass flow rate at which a surge even will occur. The mass flow rate is either measured directly by a mass flow sensor or calculated based on manifold air temperature and pressure, engine speed, and engine displacement. The mass flow rate is corrected for mach number by multiplying the mass flow, m, by the square root of the ratio of absolute compressor inlet temperature divided by a predefined reference temperature which is then further divided by the ratio of compressor inlet air pressure over a predefined reference pressure. In other words:

$$Mcorr = \frac{m * \sqrt{(compressorinlettemp/referencetemp)}}{(compressorinletpressure/referencepressure)}$$

The corrected mass flow rate at which the turbocharger will surge at the same operating corrected turbocharger speed is determined by a lookup table which specifies the mass flow rate as a function of corrected turbocharger speed. In another exemplary embodiment, a polynomial is used to determine the operating corrected turbocharger speed. The turbocharger speed, $N_{corr}$, is measured and corrected for mach number by multiplying the measured speed, N, by the square root of the ratio of absolute compressor inlet temperature over a predefine reference temperature. In other words, $$N_{corr} = N \sqrt{\frac{CompressorInletTemp}{referenceTemp}}$$

The predefined reference temperature is provided in the lookup table.

Figure 3:
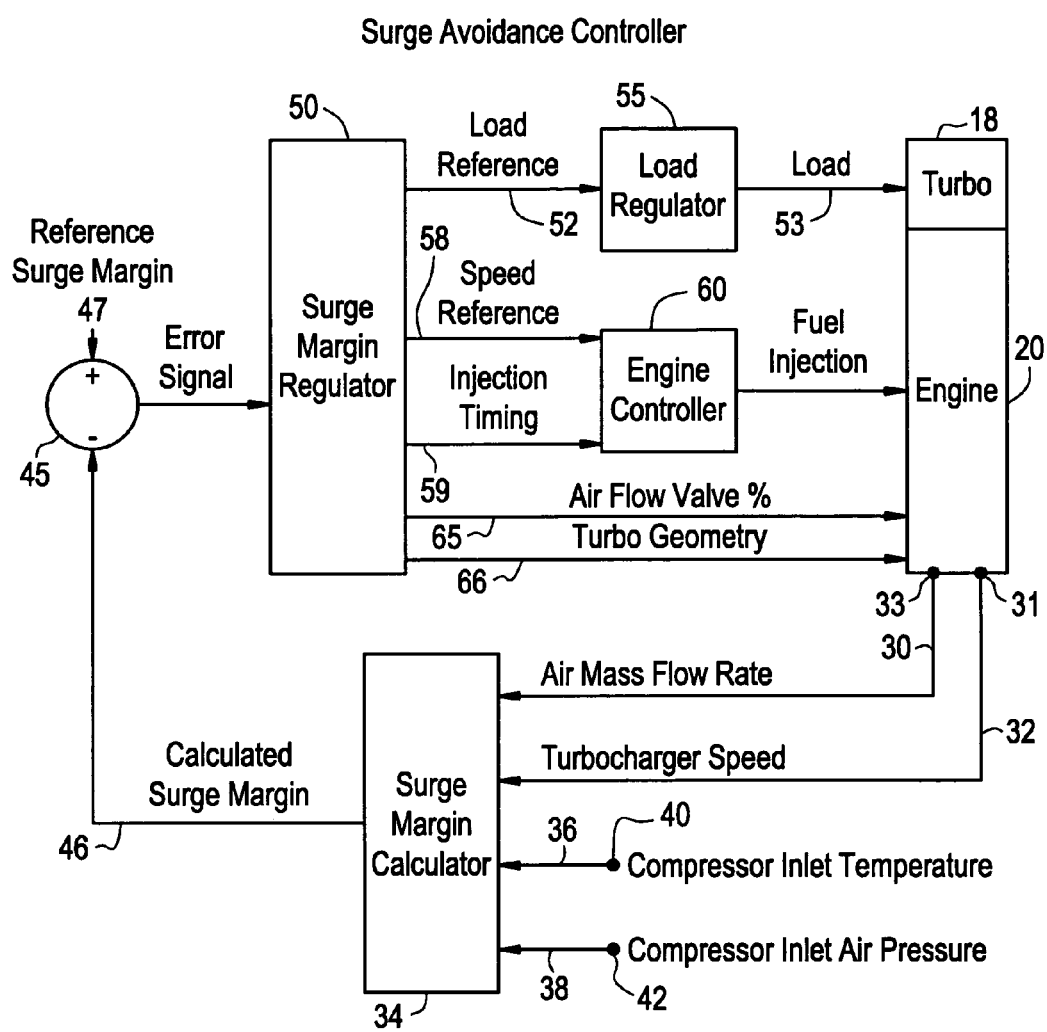
FIG. 3 is a block diagram of an exemplary embodiment of a surge avoidance controller system.

FIG. 3 is a block diagram of an exemplary embodiment of a surge avoidance controller system. Signals regarding sensor data about air mass flow rate 30 and turbocharger speed 32 are supplied to a surge margin calculator 34. This data is obtained from sensors 31, 33 located proximate the engine 20. The calculator 34 is a processor, such as but not limited to a computer processor. Data regarding compressor inlet temperature 36 and barometric air pressure 38 is also supplied to the surge margin calculator 34. In an exemplary embodiment, sensors 40, 42 are located at respective locations to measure compressor inlet temperature 36 and barometric air pressure 38.

The surge margin calculator 34 sends a calculated surge margin 46 to a reference processor 45. The reference processor 45 compares the calculated surge margin with that of a reference surge margin 47 to insure a minimum surge margin exists. The resulting error signal, if an error is detected, is sent to a surge margin regulator 50 that adjusts parameters to insure an acceptable error, wherein preference for a zero error exists. The regulator 50 establishes a reference load 52 that is applied to a load regular 55. The load regulator 55 controls engine loads, such as from an alternator. A load 53 is applied to the engine 20.

The surge margin regulator 50 also determines a speed reference 58 and injection timing 59. These values are supplied to an engine controller 60 that in turn supplies fuel injection 62 to the engine 20. The surge margin regulator 50 further establishes an airflow valve percentage 65 and where applicable to a system that allows it, adjusts turbocharger geometry 66.

Though various processors, regulators, calculators are discussed above, those skilled in the art will readily recognize that either a plurality of processors can be used or a single processor can be used to perform the various functions discussed. Individual computer programs and/or sub routines would be utilized to perform the various tasks discussed above. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Thus, the engine control system responds to the turbocharger surge margin signal to maintain a minimum level of turbocharger surge margin. The system adjusts one or more engine parameters to achieve this. The parameters include, but are not limited to, rotational speed, load, injection timing, and any actuator effecting turbocharger or engine airflow, and turbocharger geometry.

Figure 4:
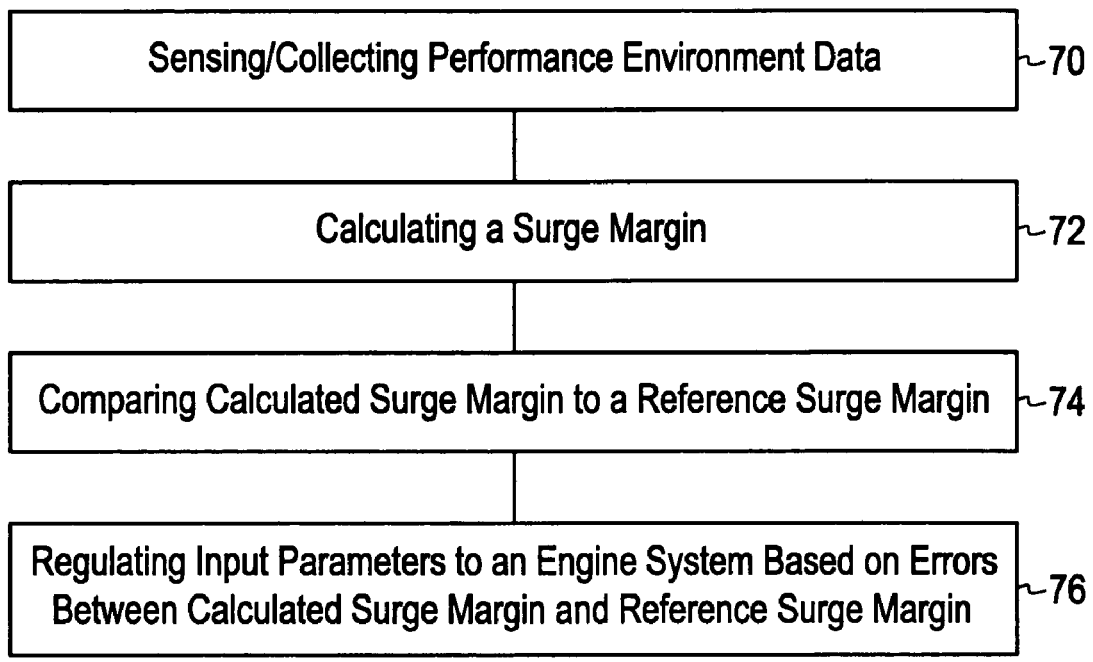
FIG. 4 is as a flow chart of exemplary steps to avoid a surge event.

FIG. 4 is as a flow chart of exemplary steps of the present invention to avoid a surge event. As discussed above, the present invention can be performed with a processor or a plurality of processors wherein software programs or subroutines are provided to carry out the steps of the present inventions. As illustrated, prior to any surge events occurring, certain performance and environmental measurements are taken, step 70. Such measurements may include, but are not limited to air mass flow rate of the engine, turbocharger speed, compressor inlet temperature, and the compressor inlet air pressure. Based on the data collected a calculated surge margin is defined, step 72. The calculated surge margin is compared to a reference surge margin value, step 74. If an error is detected between the reference value and the calculated value, certain aspects of the system are regulated to correct the error, step 76. Such aspects of the system include, but are not limited to engine load, fuel injection to the engine based on engine speed and injection timing, air flow valve percentage, and turbo geometry, etc.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What we claim is:

1. A method for preventing a surge event occurring in an engine system including a turbocharger and a diesel engine operable at a plurality of discrete speeds, the method comprising:
    determining a current mass flow rate of the engine system;
    correcting the current determined mass flow rate based on a mach number corresponding to the current mass flow rate;
    determining a corrected turbocharger speed based on a mach number corresponding to the turbocharger speed;
    determining whether a surge margin is exceeded based on the corrected current determined mass flow rate and the corrected turbocharger speed; and
    controlling an operating load input to the engine system to prevent the surge event from occurring.

2. The method according to claim 1, wherein the step of correcting the current determined mass flow rate comprises multiplying the mass flow by a square root of a ratio of an absolute compressor inlet temperature divided by a predefined reference temperature which is divided by a ratio of a compressor inlet air pressure over a predefined reference pressure.

3. The method according to claim 2, wherein the predefined reference temperature and predefined reference pressure are provided from a reference table.

4. The method according to claim 1, wherein the step of determining a corrected turbocharger speed further comprises multiplying a measured speed by a square root of a ratio of an absolute compressor inlet temperature of the engine system over a predefined reference temperature.

5. A computer software program recorded on a non-transitory computer-readable medium for preventing a surge event occurring in an engine system including a turbocharger and a diesel engine operable at a plurality of discrete speeds, the computer software program comprising program instructions for execution by a processor to:
    determine a current mass flow rate of the engine system;
    correct the current determined mass flow rate based on a mach number corresponding to the current mass flow rate;
    determine a corrected turbocharger speed based on a mach number corresponding to the turbocharger speed;
    determine whether a surge margin is exceeded based on the corrected mass flow rate and the corrected turbocharger speed; and
    control an operating load input to the engine system to prevent the surge event from occurring.

6. The computer software program according to claim 5, wherein the program instructions for execution by the processor to the determined mass flow rate further comprises program instructions for execution by the processor to multiply the mass flow by a square root of a ratio of absolute compressor inlet temperature divided by a predefined reference temperature which is divided by a ratio of a compressor inlet air pressure over a predefined reference pressure.

7. The computer software program according to claim 6, further comprising program instructions for execution by the processor to store at least one predefined reference temperature and at least one predefined reference pressure in a reference table.

8. The computer software program according to claim 5, wherein the program instructions for execution by the processor to determine a corrected turbocharger speed further comprises program instructions for execution by the processor to multiply a measured speed by a square root of a ratio of an absolute compressor inlet temperature of the engine system over a predefined reference temperature.

9. A system for preventing a surge event occurring in an engine system including a turbocharger and a diesel engine operable at a plurality of discrete speeds, the system comprising:
    at least one sensor for measuring a current mass flow rate, a turbocharger speed, a compressor inlet temperature, and a barometric air pressure of the engine system;
    a first processor responsive to the at least one sensor for determining a calculated surge margin based on a corrected mass flow rate determined by a mach number corresponding to the current mass flow rate and a corrected turbocharger speed determined by a mach number corresponding to the turbocharger speed;

a second processor configured to compare the calculated surge margin with a predefined reference surge margin;

a surge margin regulator configured to receive signal from the second processor when the surge margin is exceeded; and a load regulator responsive to the surge margin regulator for controlling an operating load input supplied to the engine system to prevent the surge event from occurring.

10. The system according to claim 9, wherein the first processor, the second processor, and the surge margin regulator are configured within a single processor.

11. The system according to claim 9, wherein the second processor calculates the surge margin by calculating a difference between an operating corrected mass flow rate of the engine system and a corrected mass flow rate wherein the corrected mass flow rate is calculated as mass flow of the turbocharger multiplied by a square root of a ratio of compressor inlet temperature divided by a predefined reference temperature, then divided by a ratio of compressor inlet air pressure divided by a predefined reference pressure.

12. The system according to claim 11, wherein the predefined reference temperature and the predefined reference pressure are provided from a reference table.

13. The system according to claim 9, wherein the second processor calculates the surge margin by calculating a turbocharger speed corrected for mach number by multiplying the measured speed by the square root of the ratio of an absolute compressor inlet temperature over a predefined reference temperature.

14. The system according to claim 13, wherein the predefined reference temperature is provided from a reference.

* * * * *

UNITED STATES PATENT AND TRADEMARK OFFICE
CERTIFICATE OF CORRECTION

| | |
|---|---|
| PATENT NO. | : 8,307,645 B2 |
| APPLICATION NO. | : 11/265709 |
| DATED | : November 13, 2012 |
| INVENTOR(S) | : Mischler et al. |

It is certified that error appears in the above-identified patent and that said Letters Patent is hereby corrected as shown below:

In Column 6, Line 37, in Claim 6, delete "to the" and insert -- to correct the --, therefor.

In Column 8, Line 3, in Claim 11, delete "compressor" and insert -- a compressor --, therefor.

Signed and Sealed this
Second Day of April, 2013

Teresa Stanek Rea
*Acting Director of the United States Patent and Trademark Office*